United States Patent [19]

Naruse et al.

[11] 4,057,522

[45] Nov. 8, 1977

[54] LIQUID ADHESIVE COMPOSITION

[75] Inventors: Kiyoji Naruse, Yokkaichi; Tadashi Ito, Ibaraki, both of Japan

[73] Assignee: Kiyoji Naruse, Yokkaichi, Japan

[21] Appl. No.: 661,824

[22] Filed: Feb. 26, 1976

[30] Foreign Application Priority Data

Feb. 27, 1975 Japan .................................. 50-24305
Feb. 27, 1975 Japan .................................. 50-24304

[51] Int. Cl.$^2$ .............................................. C08L 91/00
[52] U.S. Cl. .................... 260/28.5 AS; 260/29.6 WA; 260/29.6 RW; 427/388 C; 428/461
[58] Field of Search ............... 260/29.6 RW, 28.5 AS, 260/29.6 WA

[56] References Cited

U.S. PATENT DOCUMENTS 3,144,423  8/1964  Belak et al. .................... 260/28.5 AS
3,627,709  12/1971  Hansen et al. ............... 260/29.6 WA

*Primary Examiner*—Melvyn I. Marquis
*Attorney, Agent, or Firm*—Armstrong, Nikaido & Marmelstein

[57] ABSTRACT

A liquid adhesive composition, which is an aqueous emulsion of an atactic polypropylene, is provided. The aqueous emulsion is prepared by kneading a mixture of (a) a substantially atactic polypropylene of approximately 3,000 to 30,000 average molecular weight, (b) 0.03 to 0.5 part by weight, based on 1 part by weight of said polypropylene, of a polyvinyl alcohol with a saponification degree of at least 70% and (c) approximately 0.05 to 2.0 parts by weight of water based on 1 part by weight of the polyvinyl alcohol, and then, dispersing the kneaded mixture in water. The aqueous emulsion may further contain asphalt in an amount of 0.5 to 2.0 parts by weight based on 1 part by weight of the polypropylene. The aqueous emulsion is of improved stability, and the dried film obtained therefrom exhibits good adhesion and water resistance.

7 Claims, No Drawings

LIQUID ADHESIVE COMPOSITION

The present invention relates to liquid adhesive compositions. More particularly, it relates to liquid adhesive compositions comprising an aqueous emulsion of an atactic polypropylene, which are characterized by being stable under temperature change, storage over a long period of time and dilution with water and capable for forming a film with improved adhesion and water resistance. The liquid adhesive compositions can be used in many ways such as adhesives, waterproofing agents or water repellent agents.

Although an atactic polypropylene possesses high chemical resistance and water resistance, it has neither been heretofore put to practical use as molding materials nor as liquid applicators such as liquid adhesives, waterproofing agents and water repellent agents. This is because it is difficult to produce a stable, aqueous emulsion of an atactic polypropylene, economically. Among atactic polypropylenes, those of relatively high molecular weights are particularly restricted in their useage because of high melting points and high solution viscosities.

In general, an aqueous emulsion of a polymeric material is prepared as follows. First, the polymeric material is dissolved in an organic solvent. Into the solution so prepared, an oleophilic emulsififer and water are incorporated and then, a hydrophilic emulsifier is incorporated therein while being stirred, thereby converting the water-in-oil type emulsion to an oil-in-water type emulsion. However, an aqueous emulsion of a polymeric material so prepared is not satisfactory for the following reasons. First, the aqueous emulsion is poor in stability under temperature change, storage over a long period of time and dilution with water. Second, it requires a great amount of skill to convert the water-in-oil type emulsion to an oil-in-water type emulsion of suitable particle sizes, i.e. the particles in the oil-in-water type emulsion are liable to increase in size during the conversion operation. Thirdly, most organic solvents are harmful to the human body and highly inflammable. Further, such dispersions containing an organic solvent even in a minor amount are restricted in their use.

It now has been found that a paste or slurry prepared by kneading a mixture of predetermined amounts an an atactic polypropylene, a polyvinyl alcohol and water is readily made into a stable aqueous emulsion.

It is an object of the present invention to provide a liquid composition comprising an aqueous emulsion of an atactic polypropylene, which is capable of forming a film of improved water resistance and adhesion.

Another object of the present invention is to provide an aqueous emulsion of an atactic polypropylene, which is of improved stability to temperature change, storage over a long period of time and dilution with water.

Still another object of the present invention is to provide an aqueous emulsion of an atactic polypropylene, which contains no organic solvent and therefore, is neither harmful nor inflammable.

In accordance with the present invention, there is provided a liquid adhesive composition in the form of an aqueous emulsion, which is prepared by kneading a mixture of (a) a substantially atactic polypropylene having an average molecular weight of approximately 3,000 to approximately 30,000, (b) 0.03 to 0.5 part by weight, based on 1 part by weight of said polypropylene, of a polyvinyl alcohol having a saponification degree of at least 70% and (c) approximately 0.05 to 2.0 parts by weight of water based on 1 part by weight of the polyvinyl alcohol, and then, dispersing the kneaded mixture in water.

A paste or slurry, which is prepared by kneading a mixture of predetermined amounts of the afore-said three ingredients without the use of an organic solvent is capable of being readily formed into a stable aqueous emulsion by mixing the paste or slurry with water. While the exact mechanism of the formation of the stable aqueous emulsion cannot be elucidated, it is presumed that, when a mixture of predetermined amounts of an atactic polypropylene, a polyvinyl alcohol having a saponification degree of at least 70% and water is kneaded, the atactic polypropylene is granulated into finely divided particles of suitable size and the finely divided particles are stabilized by the hydrophilic polyvinyl alcohol.

By the term "substantially atactic polypropylene" used in the present invention is meant a polypropylene mixture comprising a predominant amount of an atactic polypropylene and a minor amount of low molecular weight polypropylenes of a stereospecific structure such as an isotactic or syndiotactic structure. The substantially atactic polypropylene is usually prepared as by-products when a stereospecific polypropylene is prepared. That is, the substantially atactic polypropylene is obtained by extracting the polymerization product of stereospecific polymerization with a suitable solvent such as n-heptane. The substantially atactic polypropylene used in the invention possesses an average molecular weight of approximately 3,000 to approximately 30,000. When the polypropylene has a molecular weight less than approximately 3,000, the resulting dried film is inferior in adhesion, mechanical strength and water resistance.

When a large amount of a polyvinyl alcohol is blended with the atactic polypropylene, the resulting dried film is poor in water resistance although the aqueous emulsion is stable. In view of the capability of forming a stable aqueous emulsion and the performances of the resulting dried film, a polyvinyl alcohol should be used in an amount of 0.03 to 0.5 part by weight, preferably 0.05 to 0.3 part by weight, based on 1 part by weight of the atactic polypropylene. The polyvinyl alcohol, which seems to function as emulsifier for the amorphous polypropylene, has preferably a percentage saponification of 70 to 98%, more preferably of 80 to 97%.

The amount of water, which is used for kneading the atactic polypropylene and the partially saponified polyvinyl alcohol, may be varied mainly depending upon the amount of the polyvinyl alcohol. It is usually within the range of approximately 0.05 to 2 parts by weight, preferably approximately 0.1 to 2 parts by weight, based on 1 part by weight of the polyvinyl alcohol. For optimum results the amount of water is within the range from approximately equal to, to 1.5 times more than the weight of the polyvinyl alcohol.

A petroleum resin may be added to a mixture of the atactic polypropylene, the polyvinyl alcohol and water in order to obtain better stability of the aqueous emulsion. As petroleum resins, both those prepared mainly from higher olefinic hydrocarbons and those prepared mainly from cyclopentadiene may be used. They are preferably in the form of solids at room temperature. The amount of the petroleum resin added is preferably approximately 0.05 to approximately 0.2 part by weight based on 1 part by weight of the atactic polypropylene.

Also, small but effective amounts of known dispersing agents may be added to the polymer mixture set forth above. Such dispersing agents include for example an anionic surface active agent such as sodium oleate or sodium stearate, and a nonionic surface active agent such as polyoxyethylene alkylphenol ether.

Optionally, asphalt may be incorporated in the aqueous emulsion of the present invention. The amount of asphalt may be varied within the range of 0.5 to 2.0 parts by weight, preferably 0.7 to 1.5 parts by weight, based on 1 part by weight of the atactic polypropylene. When the amount of asphalt is excessively large, the resulting aqueous emulsion is poor in dispersion stability and ahdesion.

The term "asphalt" used herein means a kind of bitumen, which comprises (1) oily materials such as medium, maltene or petrolene, (2) protective materials, i.e. so-called asphaltic resin and (3) carbon in the form of colloidal or ultrafine particles, and has melting points of approximately 60° C to approximately 160° C. Both native asphalt and petroleum asphalt may be used.

In general a protective film from a coating of asphalt is disadvantageous in that it is poor in solvent resistance, ductility and tensile strength. In order to obviate these disadvantages it has been heretofore proposed to blend asphalt or its aqueous emulsion with an aqueous emulsion of a polymeric material. For example, in U.S. Pat. No. 3,027,342, it is disclosed that a mixture of an acrylonitrile-butadiene copolymer and coal tar is blended with an aqueous alurry of pigment and other additives to form a stable aqueous emulsion.

The aqueous emulsion of the present invention, which has asphalt incorporated therein, is of improved dispersion stability and does not have the disadvantages of protective coatings of asphalt. It results in a protective coating having improved water resistance as compared to those formed from known polymer-asphalt aqueous emulsions.

The aqueous emulsion of the present invention may be prepared as follows. A mixture of a substantially atactic polypropylene, a polyvinyl alcohol, water and, if desired, a petroleum resin are fully kneaded into a paste or slurry. Known kneading means may be employed such as, for example, kneader and Banbury mixer. The order in which the three or more ingredients set forth above are charged in a kneading means is not critical, but it is preferable either to charge the three or more ingredients at the same time or to add an atactic polypropylene to a paste or slurry previously prepared from a polyvinyl alcohol and water. The kneading may be carried out at an elevated temperature to obtain the desired paste or slurry within a short period of time. The paste or slurry so prepared is blended with water, while being stirred, to form an aqueous emulsion. The blending of the paste or slurry with water is preferably carried out at a low temperature to provide a more stable aqueous emulsion. The concentration of the atactic polypropylene in the aqueous emulsion is not critical and may be suitably varied depending upon easiness in handling, storage and transportation. In general the concentration of the atactic polypropylene is preferably approximately 20 to 60% by weight.

By the procedure set forth above, a stable, oil-in-water type emulsion of an atactic polypropylene can be readily obtained. It is presumed that the paste or slurry of the polymer mixture has a structure such that the polyvinyl alcohol surrounds a minor particle of water so that the hydrophilic group of the polyvinyl alcohol is in intimate association with the water particle, and further the atactic polypropylene surrounds the polyvinyl alcohol in such a way that the atactic polypropylene is in intimate association with the oleophilic part of the polyvinyl alcohol. When the paste or slurry of such a structure is blended with water while being agitated, the structure set forth above is readily destroyed and, within a short period of time, converted into a structure such that the atactic polypropylene is surrounded by the polyvinyl alcohol in such a way that the polypropylene is in intimate association with the oleophilic part of the polyvinyl alcohol and further, the associated polymer particle is surrounded by water.

When asphalt is incorporated in the aqueous emulsion, it is preferable either to blend a predetermined amount of asphalt with the paste or slurry prepared by kneading the polymer mixture set forth above and then adding a large amount of water to the blend, or to blend a predetermined amount of asphalt with the aqueous emulsion of the polymer mixture set forth above. Alternatively, asphalt, the paste or slurry of the polymer mixture and a large amount of water may be simultaneously blended together. It is preferable that asphalt in a molten state maintained at approximately 140° to 160° C is blended with the paste or slurry or the aqueous dispersion of the polymer mixture maintained at approximately 50° to 90° C.

The invention will be further illustrated but is not intended to be limited by the following examples in which parts and percentages are by weight unless otherwise specified.

EXAMPLE 1

| | |
|---|---|
| Atactic polypropylene (average molecular weight, approximately 20,000) | 1,000 parts |
| Petroleum resin (No. 60 supplied by Toho Resin Co., Japan) | 100 parts |
| Polyvinyl alcohol (saponification degree, 88%, PVA 217, supplied by Nihon Gosei Kagaku Co., Japan) | 150 parts |
| Water | 150 parts |

A mixture of the above list of ingredients was kneaded in a kneader having an internal temperature of 90° C under pressure for 20 minutes and then, 300 parts of water were added to the paste so prepared and maintained at 60° C. Then, a large amount of cold water was added thereto and stirred for 10 minutes to prepare an aqueous emulsion, the solids content of which was 50%. The aqueous emulsion was opaque, and did not change after a temperature change between 2° and 10° C or during storage over a period of 2 months. It is capable of being diluted with any amount of water. The particle size of the emulsion was approximately 0.1 to 1 micron.

The aqueous emulsion so prepared was tested for its adhesion performance as follows.

a. Peel strength

A sheet of aluminum foil, 25 mm wide, was adhered onto the aqueous emulsion-coated slate of the same width (the amount of the aqueous emulsion coated was approximately 200 g/m$^2$) at an open time of 10 minutes. The aluminum foil-adhered slate was pressed under a pressure of 4 Kg/cm$^2$ for 1 hour and then, left at room temperature for 4 days. Peel strength was measured by using a tensile tester whereby the aluminum foil was peeled from the slate in a direction of 180° to the adhered surface at a rate of 200 mm/minute.

b. Normal tensile bond strength

Each of a birch plate, an aluminum plate and a polyvinyl chloride plate was adhered onto a piece of slate by using the above aqueous emulsion in an amount of approximately 200 g/m² and an open time of 5 minutes. The adhered slate was pressed by hand and left at room temperature for 4 days. The adhered slate was then cut into pieces 25 mm × 25 mm in size. The pull load required for separating each plate from the slate was measured when a pull load was applied to the cut specimen in a direction perpendicular to the adhered surface at 25° C and at a rate of 20 mm/minute. The pull load was expressed in terms of Kg/cm².

c. Tensile bond strength after aqueous alkali immersion

The test specimen of 25 mm × 25 mm size set forth above was immersed in a saturated aqueous solution of $Ca(OH)_2$ at room temperature for 14 days. After the test specimen was dried, tensile bond strength was determined in a manner similar to that described in the preceding item (b).

d. Creep under load

A tensile load of 500 g was applied to a birch plate/slate specimen prepared in a manner similar to that described in the preceding item (b), at 80° C and 100° C, and the time required for causing a predetermined amount of creep strain.

Test results are shown in Table 1, below.

Table 1

|  | Example 1 | Comparative Example 1* |
|---|---|---|
| Peel strength (Kg/25 mm) | 2.59 | 0.2 |
| Normal tensile bond strength (Kg/cm²) | | |
| Birch | 15.7 | 26.0 |
| Aluminum | 3.4 | 12.8 |
| Polyvinyl chloride | 8.3 | 18.5 |
| Alkali immersed tensile bond strength (Kg/cm²), Birch | 1.4 | 1.0 |
| Creep under load (Hrs) | More than 20 | 1.1 |

*Instead of the equeous dispersion set forth above, Adhesive GOSENIRU M-50 (Y5) (Trade name, commercially available adhesive, an aqueous emulsion of polyvinyl alcohol, supplied by Nihon Gosei Kagaku Co., Japan) was used.

EXAMPLE 2

| | |
|---|---|
| Atactic polypropylene (average molecular weight, approximately 20,000) | 1,000 parts |
| Polyvinyl alcohol (saponification degree, 98%; PVA 117, supplied by Nihon Cosei Kagaku Co.) | 150 parts |
| Water | 150 parts |

A mixture of the above-list of ingredients was kneaded in a kneader having an internal temperature of 90° C for 20 minutes, and while the mixture was gradually being cooled, a large amount of cold water was then added thereto to prepare an aqueous emulsion, the solid content of which was 30%. The aqueous emulsion was opaque and did not change with storage over a period of 3 months. It was capable of being diluted with any amount of water. The particle size of the emulsion was approximately 0.1 to 1 micron.

The aqueous emulsion so prepared was tested for its adhesion performance (dependence of tensile strength development upon the amount of time elapsed) as follows. A pair of test pieces (duck, cardboard and woodplate) each 25 mm × 150 mm in size were adhered to each other with approximately 200 g/m² of the aqueous emulsion in a manner such that an area of 25 mm × 100 mm of each test piece overlapped another, and were then pressed. The test specimen so prepared was left at room temperature and 65% RH. When 30 minutes, 1, 2 and 3 hours had elapsed respectively, tensile shear strength was measured at a pulling rate of 200 mm/min. The results are shown in Table 2, below.

Table 2

| | Time elapsed (Hr) | | | |
|---|---|---|---|---|
| Specimen | 0.5 | 1 | 3 | 24 (in Kg) |
| Card board | 6.7 | 21.0 | 42.2 | 44.0 |
| Duck | 12.6 | 17.9 | 22.4 | 35.9 |
| Wood plate | 15.9 | 76.3 | 163.8 | 270.9 |

EXAMPLE 3

| | |
|---|---|
| Atactic polypropylene (average molecular weight, approximately 20,000) | 1,000 parts |
| Petroleum resin (No. 60, supplied by Toho Resin Co., Japan) | 150 parts |
| Polyvinyl alcohol (saponification degree of 88%; PVA 217 supplied by Nihon Gosei Kagaku Co., Japan) | 100 parts |
| Calcium carbonate | 300 parts |
| Water | 150 parts |

From a mixture of the above-list of ingredients, an aqueous emulsion, the solid contents of which was 50%, was prepared in a manner similar to that in Example 1. The aqueous emulsion was of stability similar to that of Example 1.

Asphalt maintained at approximately 150° C was gradually added to the above aqueous emulsion maintained at 60° C, followed by agitation for approximately 10 minutes. The amount of asphalt added was 1.5 parts per 1 part of the atactic polypropylene contained in the aqueous emulsion.

The asphalt-containing aqueous emulsion so prepared was tested for its tensile bond strength as follows. The aqueous emulsion was coated on each of various base materials in an amount of 220 g/m² and then, air-dried until the coated layer became dark. A cement mortar having a thickness of approximately 8 mm was then coated thereon. The cement mortar used was prepared by blending 1 part of Portland cement and 3 parts of standard sand with a diluted aqueous emulsion of atactic polypropylene prepared by diluting with 60-fold amount of water the atactic polypropylene-containing aqueous emulsion similar to that used for blending with asphalt. After the cement mortar coated base material was left for 25 days, it was cut into a size of 4 cm × 4 cm. The specimen so prepared was adhered onto a steel disc by using an epoxy binder in such a way that the cement mortar-coated surface was in contact with the steel disc. Then, tensile bond strength was determined in a manner similar to that in Example 1. Results are shown in Table 3, below.

Table 3

| Base material | Tensile bond strength (Kg/cm²) | State of rupture* |
|---|---|---|
| ALC plate | 4.8 | ALC plate was ruptured on all specimens. |
| Ordinary cement mortar | 20.2 | Surface cement mortar layer was ruptured on 3 specimens, asphalt-containing layer was ruptured on 1 specimen and base cement mortar was ruptured on 1 specimen. |

Table 3-continued

| Base material | Tensile bond strength (Kg/cm²) | State of rupture* |
|---|---|---|
| Veneer plywood | 16.3 | Veneer plywood was ruptured on all specimens. |

Note:
*The state of rupture was observed on 5 specimens.

EXAMPLE 4

| | |
|---|---|
| Atactic polypropylene (average molecular weight, approximately 18,000) | 1,000 parts |
| Polyvinyl alcohol (saponification degree of 85%) | 150 parts |
| Calcium carbonate | 250 parts |
| Water | 200 parts |

A mixture of the above list of ingredients was kneaded in a kneader having an internal temperature of 90° C for 25 minutes and then, a large amount of cold water was added thereto while the mixture was gradually cooled, and stirred for 10 minutes to prepare an aqueous emulsion containing 50% of solids. The aqueous emulsion was opaque. The particle size of the emulsion was approximately 0.1 to 1 micron.

Asphalt maintained at approximately 160° C was gradually added to the above aqueous emulsion maintained at above 60° C, while being stirred, followed by agitation for approximately 5 minutes. The amount of asphalt added was 1.1 parts per 1 part of the atactic polypropylene contained in the aqueous emulsion. The asphalt-containing aqueous emulsion was tested for its adhesion performances by the procedure described in Example 3. The results were approximately the same as those in Example 3.

What we claim is:

1. A liquid adhesive composition in the form of an aqueous emulsion, which is prepared by kneading a mixture of (a) a substantially atactic polypropylene having an average molecular weight of approximately 3,000 to approximately 30,000, (b) 0.03 to 0.5 part by weight, based on 1 part by weight of said polypropylene, of a polyvinyl alcohol having a saponification degree of at least 70% and (c) approximately 0.05 to 2.0 parts by weight of water based on 1 part by weight of the polyvinyl alcohol, and then, dispersing the kneaded mixture in water.

2. A liquid adhesive composition according to claim 1, wherein said mixture further comprises approximately 0.05 to approximately 0.2 part by weight of petroleum resin based on 1 part by weight of said polypropylene.

3. A liquid adhesive composition according to claim 1, wherein said kneaded mixture is blended with 0.5 to 2.0 parts by weight of asphalt based on 1 part of said polypropylene before, after or at the time said kneaded mixture is dispersed in water.

4. A liquid adhesive composition according to claim 1, wherein said polyvinyl alcohol has a saponification degree of 70 to 98%.

5. A liquid adhesive composition according to any claim 4, wherein said polyvinyl alcohol has a saponification degree of 80 to 97%.

6. A liquid adhesive composition according to claim 1, wherein said polyvinyl alcohol is used in an amount of 0.05 to 0.3 part by weight based on 1 part by weight of said polypropylene.

7. A liquid adhesive composition according to claim 1, wherein said mixture to be kneaded contains approximately 0.1 to 2.0 parts by weight of water based on 1 part by weight of the polyvinyl alcohol.

* * * * *